Jan. 24, 1967  H. STAHLECKER ETAL  3,299,699
DEVICE FOR MEASURING THE LOAD ON THE PRESSURE
ROLLERS OF A DRAWING MECHANISM
Filed Dec. 21, 1964  4 Sheets-Sheet 1
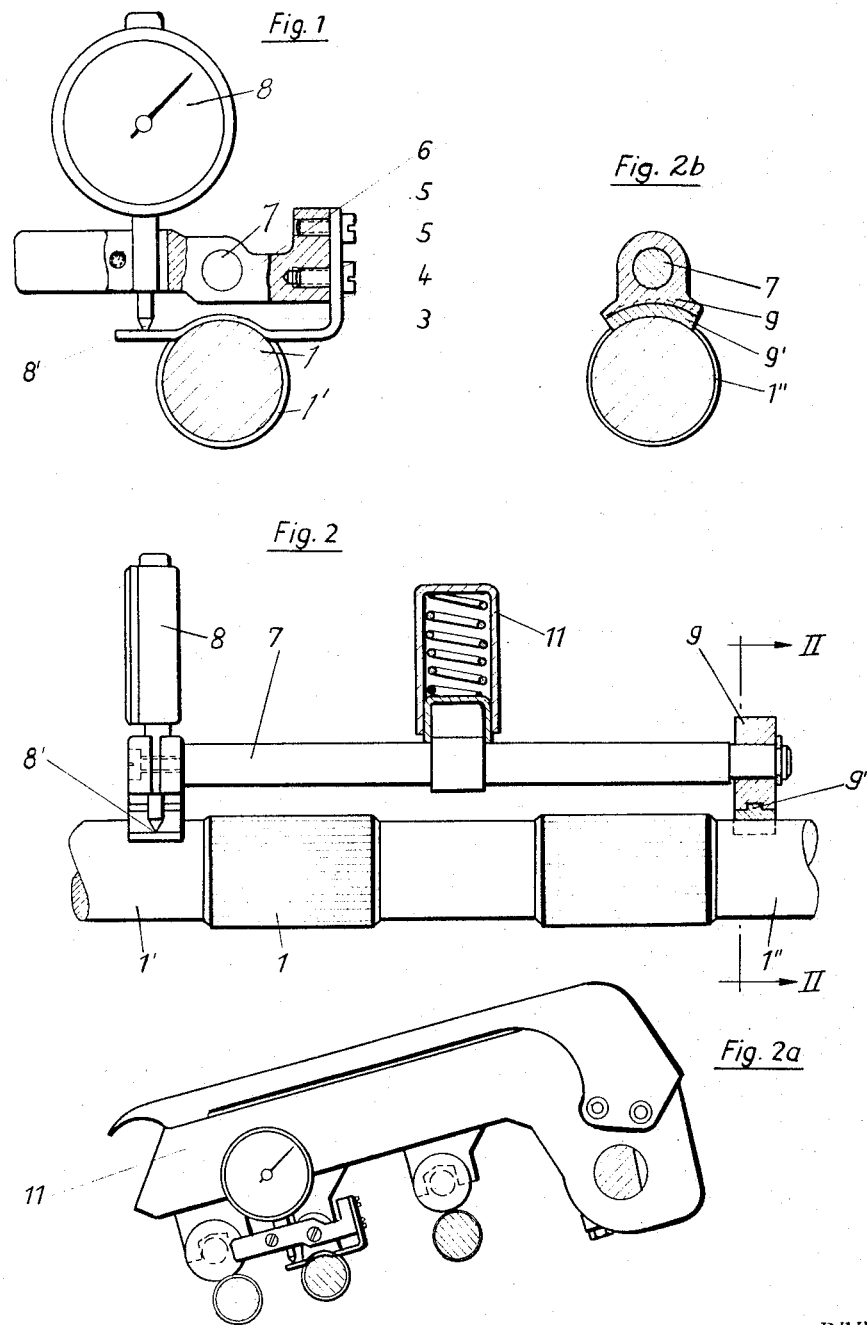
INVENTORS
Hans Stahlecker
Sigmund Kemmler
Dicke & Craig
BY
ATTORNEYS

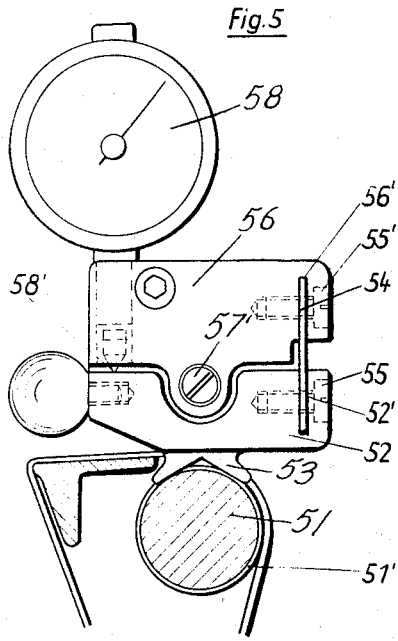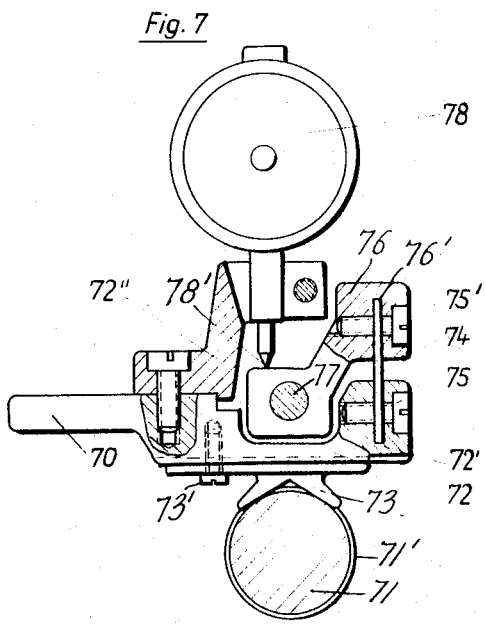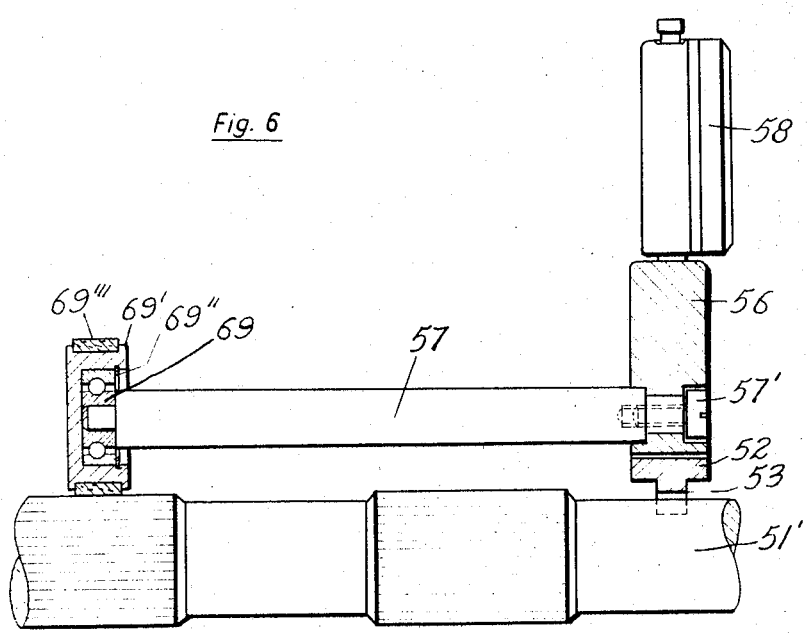

Jan. 24, 1967   H. STAHLECKER ETAL   3,299,699
DEVICE FOR MEASURING THE LOAD ON THE PRESSURE
ROLLERS OF A DRAWING MECHANISM
Filed Dec. 21, 1964   4 Sheets-Sheet 4

INVENTORS
Hans Stahlecker
Sigmund Kemmler
BY Dicke & Craig
ATTORNEY

3,299,699
DEVICE FOR MEASURING THE LOAD ON THE PRESSURE ROLLERS OF A DRAWING MECHANISM
Hans Stahlecker, Sussen, Wurttemberg, and Sigmund Kemmler, Geislingen an der Steige, Wurttemberg, Germany, assignors to Wilhelm Stahlecker G.m.b.H., Wurttemberg, Germany
Filed Dec. 21, 1964, Ser. No. 419,884
Claims priority, application Germany, Dec. 21, 1963, St 21,493
20 Claims. (Cl. 73—141)

The present invention relates to a device for measuring the pressures which are exerted by the supporting and loading arm of a drawing mechanism of a spinning or similar machine centrally upon the twin pressure rollers thereof by means of resilient elements and a measuring instrument. For carrying out such a measurement, this device is inserted in place of the pressure roller, the pressure on which is to be measured, into the central bearing member on the supporting and loading arm which normally acts upon this pressure roller and the device is then braced on both sides of this bearing member on fixed parts of the drawing mechanism.

For carrying out such measurements, it has previously been proposed to replace the pressure roller, the pressure on which is to be measured, by a spring rod which is inserted into the bearing member for this roller on the loading arm and both sides of which are braced on the lower roller of the drawing mechanism. The deflection of this spring rod is then measured and evaluated as a measurement to indicate the load which in the normal drawing operation would be exerted upon this particular pressure roller. Although with such a device it is possible to measure the pressure which is exerted upon any pressure roller in the operative position thereof and even while the drawing mechanism is actually in operation, this device still possesses certain disadvantages.

For measuring the deflection of the spring rod of such a known device, both sides of this rod are provided with levers, and the changes in distance between these levers are then measured by a dial gauge. This, however, requires that the measuring operation be carried out over and above the supporting and loading arm of the drawing mechanism. This device therefore requires relatively heavy, widely projecting, and unsupported parts which render the manipulation of the device rather difficult and also cause inaccurate measurements. It is especially difficult and sometimes even impossible to measure the pressures which are exerted upon the feed and intermediate rollers which are mounted on upwardly pivotably supporting and loading arms since the measuring arms must be extended over the loading arm. If, as also previously proposed, so-called strain-gauge strips are connected to the spring rod for the purpose of measuring the deflection of this rod electrically, it is necessary to provide a very sensitive electrical measuring instrument which is very expensive.

It is the object of the present invention to provide a measuring device of the type as first described herein which permits the pressures which are exerted by the supporting and loading arm centrally upon a twin pressure roller of a drawing mechanism to be measured very accurately and in a simple manner by means of a resilient element which acts upon a measuring instrument. This instrument comprises a movable measuring element such as a rotatable indicator which moves over a conventional graduated scale. The indicator is connected in conventional manner to a sensing member which is movable in directions of its length in response to deflections of the aforesaid resilient member to which the sensing member is operatively connected. For attaining this object, a supporting rod is inserted in place of the pressure roller, the pressure on which is to be measured, into the bearing member which normallly connects the supporting and loading arm to this pressure roller, and this supporting rod is braced at one end which forms the measuring side of the device on a fixed part through the resilient element, and the deflection of this element which is caused by the pressure upon the supporting rod is then transmitted to and measured by the measuring instrument. The supporting rod of this measuring device is braced at both sides directly on fixed parts, that is, preferably on the lower roller of the drawing mechanism and/or on an additional support which is either only employed for the measuring operation or may form a fixed part of the drawing mechanism, for example, the belt guiding rail. At the measuring side, the supporting rod may then be braced directly on such fixed parts through an arm which may form a gauge holder and the resilient element which may consist of a leaf spring and is secured to this arm. The measuring head may, however, also essentially consist of an arm which is mounted on the supporting rod and forms a gauge holder, a bracing bracket which is pivotably connected to this arm, at least one resilient element in the form of a coil spring which acts against the arm and the bracing bracket, and a measuring instrument on this arm which is adapted to indicate the extent of the deformation of the resilient element. The mentioned gauge holding arm may, however, also be omitted if the supporting rod is braced at the measuring side directly on a resilient element in the form of a spring rod which is mounted on the bracing bracket and the deflection of which is measured by a measuring instrument which is likewise mounted on the bracket. The supporting rod may also be braced at the measuring side on a measuring head which essentially consists of an arm which is mounted on the supporting rod, a dial gauge which is mounted on the arm or on the bracing bracket, and at least one resilient element in the form of a leaf spring which connects the arm to the bracket.

In certain embodiments of the invention it may be advisable to brace the measuring side of the supporting rod and/or its other side on the smooth neck parts rather than on the knurled parts of the lower roller. The measuring side of the supporting rod and/or its other side may each be braced by a prismatic foot on the lower roller. The side of the supporting rod opposite to the measuring side may also be braced by a rotatable roll on the lower roller. Furthermore, the element carrying the measuring head may be provided with one or more rolls or antifriction bearings through which the measuring head is at least partly braced on the lower roller. The resilient element in the form of a leaf spring is preferably secured to the bracing bracket and/or to the arm which is secured to the supporting rod by being inserted into clamping slots in the bracket and the arm. In order to prevent any friction which might affect the measurements, the central part on the supporting rod which is connected to the bearing element of the loading arm which normally supports the pressure roller and transmits the load thereto may be provided with bushings or the like which are mounted on antifriction bearings. The arm which is secured to the supporting rod at the measuring side of the latter and/or the bracing member on the other side of the supporting rod may also be pivotable relative to the supporting rod. The measuring device may be adjusted so as to be in accordance with the diameter of the particular pressure roller, the pressure on which is to be measured, by adjusting the distance between the supporting rod and the lower roller by exchanging the bracing bracket or the separate bracing means thereon, for example, the prismatic bracing foot, the roll or rolls, or the like, on the measuring side for others of a different size and/or by similarly exchanging the corresponding bracing means which are mounted on the other end of the supporting rod. Another modification of the invention provides that the distance between the supporting rod and the lower roller may be adjusted by shifting the arm forming the gauge holder relative to a separate clamping member in which the leaf spring is clamped.

The features and advantages of the present invention will hereafter be described in greater detail with reference to the accompanying drawings, in which:

FIGURE 1 shows, partly in section, a side view of the measuring side of a measuring device according to the invention, in which the resilient element consists of a leaf spring which is braced directly on the lower roller;

FIGURE 2 shows, partly in section, a front view of the measuring device according to FIGURES 1 and 1a which is mounted on the supporting and loading arm of a drawing mechanism;

FIGURE 2a shows a side view of the supporting and loading arm according to FIGURE 2 with the measuring device according to FIGURE 1 mounted thereon;

FIGURE 2b is a cross sectional view of the FIGURE 2 structure taken along line II—II;

FIGURE 5 shows a side view of a measuring device according to a further modification of the invention, in which the resilient element consists of a leaf spring and the bracing foot is secured to or integral with a separate bracing bracket;

FIGURE 6 shows, partly in section, a front view of the measuring device according to FIGURE 5;

FIGURE 7 shows, partly in section, a side view of a measuring device according to a further modification of the invention, in which the dial gauge is mounted on the bracing bracket which is provided with an exchangeable bracing foot;

Figure 3:
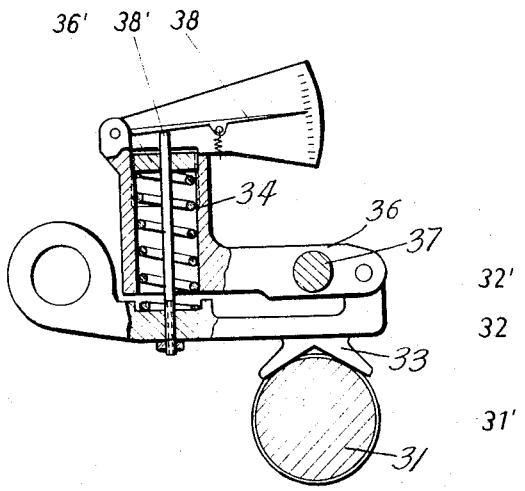
FIGURE 3 shows, partly in section, a side view of a measuring device according to a modification of the invention, in which the resilient element consists of a coil spring.

The measuring device according to the invention, as illustrated in FIGURES 1, 2 and 2b of the drawings, comprises a leaf spring 4 which is secured by screws 5 to a gauge holder in the form of an arm 6 and has an arcuate portion 3 which engages upon a neck part 1' of the lower roller 1 of the drawing mechanism. The gauge holder 6 is mounted on one end of a rod 7 and carries a dial gauge 8, the measuring pin 8' of which engages upon the free end of the leaf spring 4. As shown in FIGURE 2, this rod 7 is inserted into the bearing member on the supporting and loading arm 11 which is normally connected to the pressure roller of the drawing mechanism which is replaced by the measuring device for the purpose of measuring the pressures which are normally exerted upon this pressure roller. On the side opposite to the measuring side the supporting rod 7 carries a bracing member 9, as shown particularly in FIGURE 2b, which carries an exchangeable bushing section 9' which, in turn, is slidable on the smooth neck part 1' of the lower roller 1. The pressure which is exerted by the loading arm 11 upon the rod 7 and through the latter and the gauge holder 6 upon the leaf spring 4 produces a deformation of this leaf spring which is measured directly by the dial gauge 8. The extent of this deformation therefore serves as a measurement which indicates the strength of the forces which act upon the rod 7 and which in the normal operation of the drawing mechanism act through the roller bodies of the twin pressure roller as a clamping pressure upon the lower roller 1.

FIGURE 2a illustrates the manner in which a measuring device as shown in FIGURES 1 and 2 is mounted in the upwardly pivotable supporting and loading arm 11 in the operative position of the latter and in place of the central upper twin roller above the corresponding lower roller. The measuring device may, however, also be similarly inserted in place of the upper feed roller or the upper delivery roller.

According to the modification of the invention as shown in FIGURE 3, the measuring device comprises a bracing bracket 32 which engages with its prismatic bracing foot 33 upon the smooth neck part 31' of the lower roller 31 and is pivotally connected at 32' to a gauge holder 36 which is mounted on the supporting rod 37 which corresponds to the rod 7 according to FIGURES 1 to 3. The gauge holder 36 has a cylindrical housing part containing a coil spring 34 which acts with one end against an adjusting nut 36' which is screwed into the upper end of the housing part, and with the other end against the bracing bracket 32. When the spring 34 is compressed by the load acting upon the rod 37, this pressure is transmitted to the pointer of the dial gauge 38 by a pin 38' which is secured to the bracing bracket 32. The measuring device may be adjusted so as to indicate the measured values very accurately by screwing the nut 36' inwardly or outwardly and by also adjusting the effective length of the pin 38'.

Figure 4:
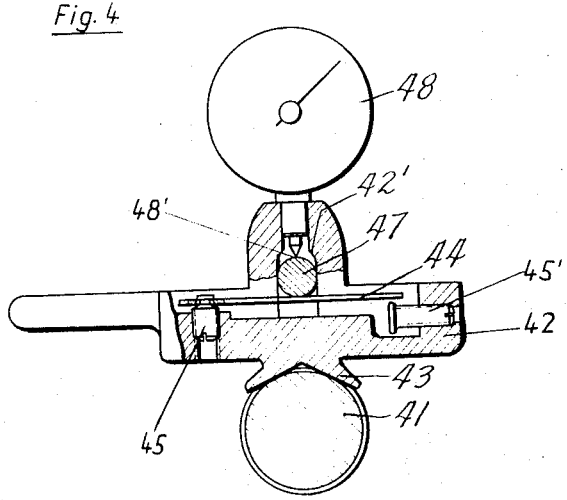
FIGURE 4 shows, largely in section, a side view of a measuring device according to another modification of the invention, in which the resilient element consists of a spring rod on which the supporting rod engages directly.

FIGURE 4 illustrates another modification of the measuring device according to the invention in which a spring rod 44 is held at opposite ends within the bracing bracket 42 by the screws 45 and 45'. The supporting rod 47 similar to the rod 7 according to FIGURES 1 to 3 is guided within a slot 42' in the bracing bracket 42 and presses directly upon the spring rod 44 transversely thereto. The deflection of this rod is measured by the dial gauge 48, the measuring pin 48' of which engages directly upon the rod 47. The measuring device may be adjusted by suitable adjustments of the screws 45 and 45'. Screw 45 serves at the same time for adjusting the distance between the supporting rod 47 and the lower roller 41.

According to the further modification of the invention as illustrated in FIGURES 5 and 6, the prismatic bracing foot 53 of the measuring device which is rigidly secured to or integral with the bracing bracket 52 engages upon the smooth neck part 51' of the lower roller 51. The bracing bracket 52 and the gauge holder 56 are provided with clamping slots 52' and 56' into which a leaf spring 54 is inserted which is secured therein by screws 55 and 55'. The gauge holder 56 is provided with a bore into which the end of the supporting rod 57 is inserted and secured to the holder 56 by a screw 57' in a manner so as to permit the gauge holder to be slightly pivoted about the axis of the supporting rod 57. This pivotability of the gauge holder 56 permits the measuring device to be adjusted so as to compensate for minor variations in position when the supporting and loading arm (not shown) is pressed downwardly to the measuring position which generally corresponds to the normal operative position of the drawing mechanism. The dial gauge 58 is clamped within the gauge holder 56 in a position so that the tip of the measuring pin 58' engages upon the end of the bracing bracket 52 opposite to the end carrying the leaf spring 54. On the other end of the supporting rod 57 a bracing roll 69 is rotatably mounted on a roller bearing from which, after a locking ring 69" has been removed, the roller body 69' may be withdrawn if it is to be exchanged for another roller body with a different diameter. Instead of exchanging the entire roller body, it may, however, be sufficient if merely the lining 69''' is exchanged on the roller body 69'. The detachable connection between the gauge holder 56 and the supporting rod 57 and the symmetrical shape of the gauge holder 56 also permit the entire measuring device to be reversed on the supporting rod 57 if similar tests are also to be carried out on other parts of the drawing mechanism.

According to the further modification of the invention, as illustrated in FIGURE 7, the prismatic bracing foot 73 which engages upon the neck part 71' of the lower roller forms a separate element which is removably connected to the bracing bracket 72 and may therefore be exchanged for another. This bracing foot 73 may be inserted into a guide groove in the bracing bracket 72 and be secured thereto by a screw 73'. This possibility of exchanging the bracing foot 73 and possibly also the roller body 69' according to FIGURE 6 or the entire roll 69, permits the distance which occurs in the operation of the drawing mechanism between the shaft of the corresponding pressure roller and the lower roller. The dial gauge 78 is in this case mounted on a separate bracket 72'' which is secured by a screw to the bracing bracket 72. The leaf spring 74 which is again secured by screws 75 and 75' in clamping slots 72' and 76' in the bracing bracket 72 and in an arm 76 on the supporting rod 77 is bent by the action of the supporting rod 77 upon the arm 76. The bracing bracket 72, the handle 70, and the dial gauge 78 are therefore rigidly connected to each other.

Figure 8:
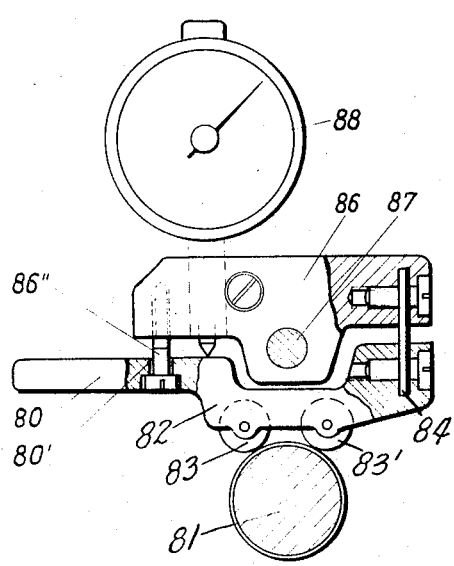
FIGURE 8 shows, partly in section, a side view of a measuring device similar to that as shown in FIGURE 5, but provided with bracing rolls.
Figure 9:
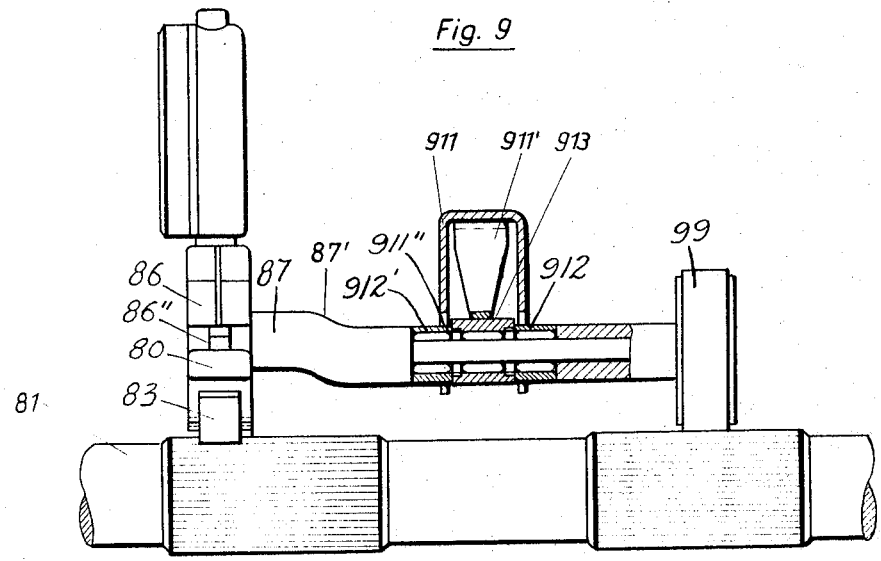
FIGURE 9 shows, partly in section, a front view of the measuring head of the device according to FIGURE 8 and of a cranked supporting rod with antifriction bearings at its connection to the loading arm.

In the further measuring device according to the invention, as illustrated in FIGURES 8 and 9, the bracing bracket 82 carries a pair of rolls 83 and 83' which may be in the form of antifriction bearings and engage upon the lower roller 81. The handle 80 is provided with a bore 80' through which a screw 86'' is screwed into the gauge holder 86. This screw 86'' which fits loosely into the bore 80' limits the extent of the movement of the gauge holder 86 in the direction away from the bracing bracket 82 and thus prevents the leaf spring 84 from being excessively bent in this direction. Spring 84 is prevented from being excessively bent in the opposite direction due to a movement of the gauge holder 86 and the bracing bracket 82 toward each other by the small distance between these parts underneath the supporting rod 87. As shown in FIGURE 9, the supporting rod 87 may in this case be cranked at 87' and the part thereof which is to be inserted into the bearing member for the shaft of the pressure roller on the supporting and loading arm 911 is provided with bushings 912 and 912' and a bearing ring 913 which are mounted on antifriction bearings. The bearing ring 913 prevents any undue friction which might occur in radial and/or axial directions between the pressure-producing element, for example, a spring 911' or other loading element, and the supporting rod 87, while the bushings 912 and 912' prevent any undue friction between the supporting rod 87 and the walls of the slots 911'' in the loading arm 911. By cranking the supporting rod 87 at 87', the distance is increased between the point of connection of this rod in the gauge holder 86 and the lower roller 81 so that the rolls or anti-friction bearings 83 and 83' can be easily mounted and, if necessary, exchanged for others.

Figure 10:
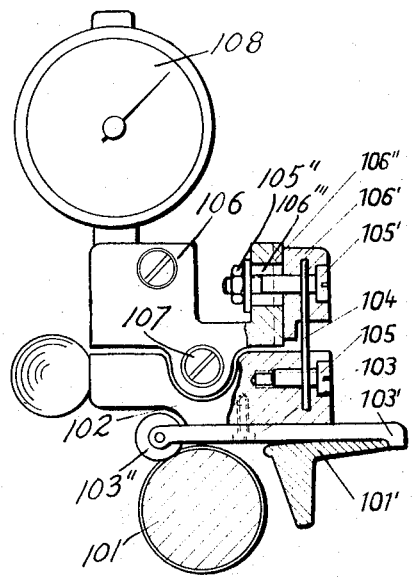
FIGURE 10 shows, partly in section, a side view of a measuring device similar to that as shown in FIGURE 8 but provided with a vertically adjustable gauge holder and with only one bracing roll which is mounted on a bracing plate which engages upon the guide rail of the lower belt.

According to the further modification of the invention as illustrated in FIGURE 10, the bracing bracket 102 is connected to a bracing plate 103 which is provided on one side with a claw 103' which engages upon the guide rail 101' for the lower belt. The other side of the bracing plate 103 carries a roll 103'' which engages upon the lower roller 101. The leaf spring 104 of this measuring device is not secured directly to the gauge holder 106 but by means of a screw 105' to a separate clamping member 106'. This clamping member 106' is connected to the gauge holder 106 so as to be slidably adjustable by means of guide grooves 106'' in the holder 106 and it may be screwed tightly to the latter by means of a nut 105'' on the end of the screw 105'. The adjustability of the clamping member 106' is limited by the length of the slot 106'''. By this arrangement it is possible to vary the distance between the supporting rod 107 and the bracing bracket 102 without affecting the length of the bendable part of the leaf spring 104. This adjustability not only permits the measuring device to be easily adjusted or readjusted, but also the distance between the supporting rod 107 and the lower roller 101 to be adjusted so that the position of the measuring device will always correspond exactly to the height at which the particular pressure roller is located when the drawing mechanism is in operation.

Although our invention has been illustrated and described with reference to the preferred embodiments thereof, we wish to have it understood that it is in no way limited to the details of such embodiments but is capable of numerous modifications within the scope of the appended claims.

Having thus fully disclosed our invention, what we claim is:

1. A device for measuring the pressures which are exerted by the supporting and loading arm of a drawing mechanism of a spinning or similar machine centrally upon the twin pressure rollers of said mechanism comprising a supporting rod adapted to be mounted on said supporting and loading arm in place of the pressure roller the pressure on which is to be measured, bracing means for bracing said supporting rod near both ends thereof on a fixed support, said bracing means near one end of said supporting rod forming the measuring side of said device, said last-named means comprising a member connected to said one end of said supporting rod and a resilient element supported on said member and adapted to be braced on said fixed support, and a measuring instrument having a sensing component in contact with and movably responsive to the deflection of said resilient element, the movements of said sensing component being reflected in indications of said measuring instrument.

2. A device for measuring the pressures which are exerted by the supporting and loading arm of a drawing mechanism of a spinning or similar machine essentially upon the twin pressure rollers of said mechanism comprising a supporting rod adapted to be mounted on said supporting and loading arm in place of the pressure roller the pressure of which is to be measured, bracing means for bracing said supporting rod near both ends thereof on a fixed support, said bracing means near one end of said supporting rod forming the measuring side of said device, said last-named means comprising a member connected to said one end of said supporting rod and a resilient element supported on said member and adapted to be braced on said fixed support, and a measuring instrument supported on said member, said instrument comprising a movable measuring element, and a sensing member in driving connection therewith, said sensing member being movably responsive to the deflection of said resilient element.

3. A measuring device as defined in claim 2, wherein said fixed support comprises the lower roller of the drawing mechanism associated with the pressure roller the pressure on which is to be measured, said lower roller being connected to a belt, and a guide rail for said belt, said guide rail being further included in said fixed support.

4. A measuring device as defined in claim 3, wherein said lower roller comprises a smooth neck part and said fixed support on which said supporting rod is adapted to be braced at least through said resilient element consists of said smooth neck part.

5. A measuring device as defined in claim 3, wherein said bracing means further comprise a prismatic bracing foot connected to said resilient element and adapted to engage upon said lower roller.

6. A measuring device as defined in claim 3, wherein said bracing means further comprise a prismatic bracing foot connected to the other end of said supporting rod and adapted to engage upon said lower roller.

7. A measuring device as defined in claim 3, wherein said bracing means further comprise at least one rotatable roll connected to said resilient element and adapted to engage upon said lower roller.

8. A measuring device as defined in claim 3, further comprising means for permitting the distance between said supporting rod and said lower roller to be varied by exchanging at least a part of said bracing means at least at one end of said supporting rod for similar bracing means of a different size.

9. A measuring device as defined in claim 2, wherein said resilient element consists of a leaf spring adapted to engage directly upon said fixed support, said member of said bracing means comprising an arm mounted on said supporting rod and carrying said measuring instrument, said leaf spring being secured at one end to said member and acting with its other end upon said sensing member of said measuring instrument.

10. A measuring device as defined in claim 2, wherein said member comprises an arm mounted on said supporting rod, said bracing means near said one end of said supporting rod further comprising a bracing bracket pivotably connected to said arm and adapted to be braced on said fixed support, said resilient element consisting of a coil spring acting at one end against said arm and at the other end against said bracing bracket, and whereby the distance between said arm and said bracket is measured.

11. A measuring device as defined in claim 10, wherein said bracing means further comprise at least one rotatable roll connected to said bracing bracket and adapted to engage upon the lower roller of said twin pressure rollers.

12. A measuring device as defined in claim 10, wherein said bracing means further comprise at least one antifriction bearing connected to said bracing bracket and adapted to engage upon the lower roller of said twin pressure rollers.

13. A measuring device as defined in claim 2, wherein said member comprises a bracing bracket, said resilient element consisting of a spring rod mounted in said bracing bracket, said measuring instrument consisting of a dial gauge including said measuring element and said sensing member, said sensing member comprising a measuring pin engaging said supporting rod.

14. A measuring instrument as defined in claim 2, wherein said bracing means on said measuring side form at least two spaced parts, the distance between said two parts being measured by said measuring instrument, one of said parts consisting of said member forming an arm mounted on said supporting rod and the other part forming a bracing bracket, said resilient element consisting of a leaf spring connecting said arm to said bracket.

15. A measuring device as defined in claim 14, further comprising means for rigidly securing one end of said leaf spring to said bracket, and means for permitting the distance between said supporting rod and said lower roller to be varied comprising a separate connecting member and means for rigidly securing the other end of said leaf spring to said connecting member and for adjustably securing said connecting member to said arm so as to permit the distance between said arm from said bracket to be varied.

16. A measuring device as defined in claim 2, wherein said resilient element consists of a leaf spring, said bracing means near said one end of said supporting rod further comprising a bracing bracket, said member and said bracing bracket each having a clamping slot, said leaf spring being clamped at opposite ends rigidly into said clamping slots.

17. A measuring device as defined in claim 2, further comprising antifriction bearing means on the central part of said supporting rod which is adapted to be connected to and loaded by the supporting and loading arm of said drawing mechanism.

18. A measuring device as defined in claim 2, further comprising means for securing said member carrying said measuring instrument to said supporting rod so as to be pivotable relative thereto.

19. A measuring device as defined in claim 2, further comprising means on said bracing means for the other end of said supporting rod for securing the same to said rod so as to be pivotable relative thereto.

20. A measuring device as defined in claim 2, wherein said drawing mechanism comprises a lower roller engaged by a belt, a guide rail for said belt, said fixed support comprising said guide rail.

References Cited by the Examiner

UNITED STATES PATENTS

| | | | |
|---|---|---|---|
| 2,319,229 | 5/1943 | Converse | 73—141 |
| 2,833,145 | 5/1958 | McCullough | 73—144 |
| 2,888,826 | 6/1959 | Barnes et al. | 73—143 |
| 2,992,555 | 7/1961 | Butler | 73—141 |

RICHARD C. QUEISSER, *Primary Examiner.*

CHARLES A. RUEHL, *Assistant Examiner.*